US010504363B2

(12) United States Patent
Blekken et al.

(10) Patent No.: US 10,504,363 B2
(45) Date of Patent: *Dec. 10, 2019

(54) VEHICLE DETECTION (71) Applicant: Q-Free ASA, Trondheim (NO)

(72) Inventors: Brage Blekken, Trondheim (NO);
Anders Ivar Hagen, Hommelvik (NO);
Ola Martin Lykkja, Rasta (NO)

(73) Assignee: Q-Free ASA, Trondheim (NO)

( * ) Notice: Subject to any disclaimer, the term of this patent is extended or adjusted under 35 U.S.C. 154(b) by 0 days.

This patent is subject to a terminal disclaimer.

(21) Appl. No.: 16/123,925

(22) Filed: Sep. 6, 2018

(65) Prior Publication Data

US 2019/0019406 A1 Jan. 17, 2019

Related U.S. Application Data (63) Continuation of application No. 15/061,644, filed on Mar. 4, 2016, now Pat. No. 10,109,186.

(30) Foreign Application Priority Data

Mar. 6, 2015 (GB) .................................. 1503855.7

(51) Int. Cl.
*G06F 19/00* (2018.01)
*G06G 7/76* (2006.01)
(Continued)

(52) U.S. Cl.
CPC ............ *G08G 1/0133* (2013.01); *G01S 13/04* (2013.01); *G01S 13/87* (2013.01); *G01S 13/91* (2013.01);
(Continued)

(58) Field of Classification Search
CPC combination set(s) only.
See application file for complete search history.

(56) References Cited

U.S. PATENT DOCUMENTS 4,789,941 A   12/1988  Nunberg
4,985,705 A *  1/1991  Stammler ............... G01S 7/003
                                                  340/910

(Continued)

FOREIGN PATENT DOCUMENTS

CN        1118093        3/1996
CN      103149599       6/2013
(Continued)

OTHER PUBLICATIONS

Extended Search Report for European Application No. 16158379.4, dated Aug. 23, 2016.
(Continued)

*Primary Examiner* — Khoi H Tran
*Assistant Examiner* — Jorge O Peche
(74) *Attorney, Agent, or Firm* — Klarquist Sparkman, LLP (57) ABSTRACT

A vehicle detection and classification system which comprises a plurality of proximity sensors is distributed in a fixed spatial array relative to a road such that a distance of each sensor to the nearest adjacent sensor is less than a minimum horizontal dimension of a vehicle to be detected. The array has a maximum dimension greater than the minimum horizontal dimension of a vehicle to be detected. Each of the sensors is configured to determine presence or absence of a vehicle and to communicate data regarding said presence determination to a data processing system, wherein the data processing system is configured to use data from a plurality of the sensors to detect and classify a vehicle on the road based on at least one dimension of the vehicle.

20 Claims, 10 Drawing Sheets (51) Int. Cl.

| | | |
|---|---|---|
| *G08G 1/00* | (2006.01) | |
| *G08G 1/01* | (2006.01) | |
| *G01S 13/91* | (2006.01) | |
| *G08G 1/015* | (2006.01) | |
| *G08G 1/02* | (2006.01) | |
| *G08G 1/056* | (2006.01) | |
| *G01S 13/04* | (2006.01) | |
| *G01S 13/87* | (2006.01) | |

(52) U.S. Cl.
CPC ............. *G08G 1/015* (2013.01); *G08G 1/02* (2013.01); *G08G 1/056* (2013.01)

(56) References Cited

U.S. PATENT DOCUMENTS

| | | | | |
|---|---|---|---|---|
| 5,281,965 A * | 1/1994 | Hoekman | ............. | G08G 1/042 340/941 |
| 5,537,110 A | 7/1996 | Iida et al. | | |
| 5,546,188 A * | 8/1996 | Wangler | ............. | A01M 7/0089 356/398 |
| 5,617,086 A * | 4/1997 | Klashinsky | ............. | G08G 1/08 340/436 |
| 5,798,983 A | 8/1998 | Kuhn et al. | | |
| 5,835,054 A * | 11/1998 | Warhus | ............. | G01S 7/292 342/22 |
| 6,204,778 B1 * | 3/2001 | Bergan | ............. | G08G 1/075 340/905 |
| 6,304,321 B1 * | 10/2001 | Wangler | ............. | G01S 17/89 356/398 |
| 6,744,378 B1 * | 6/2004 | Tyburski | ............. | E01F 11/00 200/86 A |
| 6,900,740 B2 * | 5/2005 | Bloomquist | ..... | G08G 1/096716 340/905 |
| 9,250,323 B2 * | 2/2016 | Ranney | ............. | G01S 13/9029 |
| 9,412,271 B2 * | 8/2016 | Sharma | ............. | G08G 1/052 |
| 2002/0140924 A1 * | 10/2002 | Wangler | ............. | G01S 7/4802 356/28 |
| 2002/0177942 A1 * | 11/2002 | Knaian | ............. | G08G 1/02 701/117 |
| 2003/0042304 A1 | 3/2003 | Knowles et al. | | |
| 2003/0189500 A1 * | 10/2003 | Lim | ............. | G08G 1/0175 340/937 |
| 2003/0201909 A1 * | 10/2003 | Hilliard | ............. | G08G 1/015 340/940 |
| 2004/0008514 A1 * | 1/2004 | Lee | ............. | G07B 15/06 362/259 |
| 2004/0061628 A1 * | 4/2004 | Hill | ............. | E01F 11/00 340/942 |
| 2004/0067004 A1 * | 4/2004 | Hill | ............. | G08G 1/02 385/13 |
| 2005/0046584 A1 * | 3/2005 | Breed | ............. | B60C 11/24 340/13.31 |
| 2005/0122235 A1 * | 6/2005 | Teffer | ............. | G08G 1/01 340/937 |
| 2006/0037400 A1 * | 2/2006 | Haynes | ............. | G01S 11/14 73/587 |
| 2006/0137913 A1 | 6/2006 | Dicko | | |
| 2007/0162218 A1 * | 7/2007 | Cattin | ............. | G08G 1/015 701/117 |
| 2008/0100706 A1 * | 5/2008 | Breed | ............. | B60C 11/24 348/143 |
| 2009/0284395 A1 | 11/2009 | Bushman | | |
| 2010/0141478 A1 * | 6/2010 | Lim | ............. | G08G 1/042 340/933 |
| 2011/0227782 A1 * | 9/2011 | Tseng | ............. | G01S 7/415 342/115 |
| 2011/0260906 A1 * | 10/2011 | Utagawa | ............. | G01S 7/03 342/27 |
| 2011/0267221 A1 | 11/2011 | Brundick et al. | | |
| 2012/0002388 A1 * | 1/2012 | Utagawa | ............. | H01Q 9/285 361/782 |
| 2012/0089299 A1 * | 4/2012 | Breed | ............. | B60C 11/24 701/36 |
| 2013/0063282 A1 * | 3/2013 | Baldwin | ............. | B61L 29/282 340/941 |
| 2013/0099943 A1 * | 4/2013 | Subramanya | ......... | G01S 7/2926 340/933 |
| 2013/0151135 A1 * | 6/2013 | Aubrey | ............. | G08G 1/0116 701/118 |
| 2013/0300583 A1 * | 11/2013 | Wignot | ............. | G01S 13/91 340/907 |
| 2014/0195138 A1 * | 7/2014 | Stelzig | ............. | G08G 1/0116 701/119 |
| 2014/0226146 A1 | 8/2014 | Loschmidt | | |
| 2014/0278030 A1 * | 9/2014 | Meena | ............. | G08G 1/015 701/118 |
| 2014/0306799 A1 * | 10/2014 | Ricci | ............. | H04W 4/21 340/5.83 |
| 2014/0333469 A1 | 11/2014 | Nagy | | |
| 2014/0333472 A1 | 11/2014 | Nagy | | |
| 2015/0234042 A1 | 8/2015 | Nagy | | |
| 2015/0316426 A1 * | 11/2015 | Feichtinger | ......... | G01G 19/024 702/42 |
| 2016/0027299 A1 * | 1/2016 | Raamot | ............. | G08G 1/08 340/917 |
| 2017/0066406 A1 * | 3/2017 | Ricci | ............. | H04W 4/21 |
| 2017/0358205 A1 * | 12/2017 | Ippolito | ............. | G08G 1/042 |
| 2019/0180610 A1 * | 6/2019 | Liu | ............. | G08G 1/012 |

FOREIGN PATENT DOCUMENTS

| | | |
|---|---|---|
| DE | 4411994 | 11/1995 |
| DE | 19646632 | 5/1998 |
| DE | 202014002729 | 4/2014 |
| EP | 2284564 | 2/2011 |
| EP | 2910968 | 1/2017 |
| GB | 2513399 | 10/2014 |
| JP | 2002099987 | 4/2002 |
| KR | 20010097490 | 11/2001 |
| KR | 20120030175 | 3/2012 |
| WO | WO96/34252 | 10/1996 |
| WO | WO2013/023072 | 2/2013 |

OTHER PUBLICATIONS

Search Report for United Kingdom Application No. 1603871.3, dated Jul. 21, 2016.

* cited by examiner

VEHICLE DETECTION

CROSS REFERENCE TO RELATED APPLICATION

The present application is a continuation of U.S. patent application Ser. No. 15/061,644, filed Mar. 4, 2016, which claims priority from pending United Kingdom Patent Application No. 1503855.7 filed Mar. 6, 2015, which are incorporated herein by reference.

BACKGROUND

This application relates to the detection and classification of vehicles travelling on a road.

In modern road networks it is often necessary to determine the types of vehicles on a given road for a number of reasons. It is particularly useful at toll points to be able to determine automatically the type of vehicle approaching the barrier so that an appropriate amount can be charged to the driver according to the type of vehicle in question. A further application for the detection and classification of vehicles is in traffic monitoring systems, where it is useful to the operator of the road network to be able to determine the levels of traffic and the vehicle composition of the traffic in order to make strategic decisions relating to the operation of the roads.

Conventional systems used for this purpose often rely on either inductive sensors that count the number of wheel axles present on a vehicle, or utilise cameras alongside image processing techniques to classify vehicles. However, these systems give rise to a number of problems which the present invention seeks to address.

A typical inductive system comprises an inductive loop that operates using induction to detect the wheel axles as they pass the loop. Such systems however are prone to issues when multiple vehicles pass the sensor in quick succession, as they cannot distinguish between individual vehicles in bumper-to-bumper traffic, instead often detecting very long singular vehicles. Furthermore, only vehicles larger than a particular size can be detected, making it difficult to detect and classify bicycles, scooters and motorcycles, and false positive detections are not uncommon.

Systems that utilise optical techniques such as laser sensors or cameras have difficulty when visibility is poor, which is often the case in non-ideal weather conditions such as rain, snow and fog. However, hot weather can also be a problem as fumes from the road surface (normally made of asphalt) can dramatically hinder the performance of such optical systems. Cameras can often suffer problems with occlusion whereby, depending on the placement of the camera and the relative positions of the vehicles, a first vehicle may obstruct the view of a second vehicle, preventing the proper detection and classification of the vehicles. Laser based systems often struggle to differentiate between a fast long vehicle and a slower shorter vehicle. Furthermore, even with decreasing costs relating to optical devices in recent years, the physical implementations of these systems can be complex and expensive.

Both inductive loop and laser based systems are also usually calibrated or optimised for a particular range of speeds and require the vehicles to remain in a particular lane whilst being detected. However, the Applicant has appreciated that it would be advantageous to be able to detect and classify vehicles driving at any speed, in any driving pattern, in any prevailing weather conditions.

SUMMARY

The present invention seeks to provide an alternative system that can for example be used in place of or to enhance conventional systems known in the art.

When viewed from a first aspect, the present invention provides a vehicle detection and classification system comprising a plurality of proximity sensors distributed in a fixed spatial array relative to a road such that a distance of each sensor to the nearest adjacent sensor is less than a minimum horizontal dimension of a vehicle to be detected but the array has a maximum dimension greater than said minimum horizontal dimension of a vehicle to be detected, each of said sensors being configured to determine presence or absence of a vehicle and to communicate data regarding said presence determination to a data processing system, said data processing system being configured to use data from a plurality of said sensors to detect and classify a vehicle on said road based on at least one dimension of said vehicle.

It will be appreciated by a person skilled in the art that in accordance with the invention, the vehicle detection and classification system provides an advantageous arrangement for determining one or more parameters associated with individual vehicles in proximity of the sensor array. The resolution of the sensor array is such that the sensors are close enough together to be able to resolve particular vehicles of interest while the extent of the sensor array is wide enough, at least in preferred embodiments, to provide adequate detection of vehicles of interest in any lane on a multi-lane road, as well as vehicles that are changing between lanes whilst traversing the sensor array. Embodiments of the invention could be used just for classification of vehicles into different types. However embodiments of the invention are additionally or alternatively able to determine a speed and/or angle of travel of a vehicle.

Although the separation between the sensors can be varied to suit a particular application, the distances are typically in the range of between 0.1 m and 2 m, e.g., between 0.2 m and 1 m. The separation may be different in one direction compared to another (e.g., with sensors spaced closer together in a longitudinal direction than a transverse direction). The spacings in one or both directions could be regular, varying or irregular. The array could have a square, rectangle, diamond, interleaved or any other pattern.

There are a number of possible configurations for such an array of sensors. In a set of embodiments the array of sensors is provided in one or more planes parallel to the surface of the road. This arrangement is particularly advantageous for ease of detection.

In a set of embodiments the array of sensors is disposed beneath or flush with the surface of the road. The Applicant has appreciated that it would be particularly advantageous to place the sensor array beneath or flush with the road, such that vehicles traverse over the sensors, minimising the amount of additional infrastructure needed to implement the system.

The Applicant has also appreciated that there are situations where it would be advantageous to arrange the sensor array such that it is disposed above the road surface, such as in overhead gantries or on the ceiling of a tunnel. In a set of embodiments therefore the array of sensors is disposed above the surface of the road such that vehicles pass beneath them. Of course in a practical system a mixture of such arrangements might be employed.

There are a number of configurations possible for the relative spatial resolutions of the sensor array and the individual sensors, i.e., the vertical and horizontal spacings between individual sensors within the array compared to the coverage of individual sensors. The Applicant has appreciated that it is not necessary for example to provide blanket coverage of a piece of road as long as vehicles can be unambiguously classified.

Each of the sensors within the sensor array communicates in some way with the data processing system, such that determinations can be made as to the presence of a vehicle in proximity to said sensor. In a set of embodiments at least some of the sensors are configured to communicate said data to said data processing system via at least some other sensors. Such a relay arrangement may be beneficial in reducing the number of interconnections required, or the wireless transmission range of individual sensors, which may have an advantageous impact on cost and battery life.

The data processing system could comprise a centralised unit. In some embodiments however, said data processing system is at least partially distributed across the array of sensors. The Applicant has appreciated that it may be advantageous to provide the sensor array with the ability to perform data processing locally by distributing computations across the sensor array. Intermediate arrangements are also possible whereby a master sensor carries out some processing for a localised group. The sensors may communicate with each other to share data in order to carrying out data processing.

There are a wide range of technologies that would be possible to use in the implementation of the present invention, such as ultrasound, infrared and radar based sensors. However, in a set of embodiments the sensors comprise ultra-wideband radar sensors. Ultra-wideband radar is particularly advantageous for its ability to penetrate materials such as snow, ice and gravel where radar sensors with a smaller bandwidth would fail. Additional benefits of such ultra-wideband radar sensors are that they provide excellent time-resolution and can detect objects at relatively short distances.

The sensors could be provided with power from an external source, but in a set of embodiments, the sensors are battery powered. This reduces the cost of implementation, especially in a set of embodiments wherein the sensors are operated in a burst mode. In a set of embodiments, each burst comprises a pulse train modulated with a Direct Sequence Spread Spectrum (DSSS) code, a known signal having the characteristics of pseudo-random noise. In one example the chip rate may be between 1 and 100 MHz. In such embodiments, the signals transmitted by the sensor comprise discontinuous bursts of discontinuous pulses. Since the sensor is then transmitting for only a fraction of the time (i.e., it has a relatively low duty cycle), a significant reduction in power consumption can be achieved. A person skilled in the art will appreciate this example is non-limiting and other such configurations are possible.

In a set of embodiments ultra-wideband sensors are arranged to operate in the frequency range between 3.1 and 10.6 GHz. In a set of embodiments the sensors are in compliance with the frequency range (3.4 to 4.9 GHz) authorised for unlicensed use by the European Telecommunications Standards Institute (ETSI) in Europe. In another, potentially overlapping, set of embodiments, the sensors are in compliance with the frequency range authorised for unlicensed outdoor use by the Federal Communications Commission (FCC) in the U.S.

More generally, as will be appreciated by those skilled in the art, the exact frequency ranges authorised for particular uses vary from country to country and even over time. For example the sensors may operate in bands at 6 GHz, 24 GHz or 77 GHz to give just some further examples. References to ultra-wideband radar herein should not therefore be construed as being limited to a particular frequency range or regulatory limits.

A further advantage of utilising ultra-wideband radar technology that has been appreciated by the Applicant is that the sensors can, if desired, be arranged to communicate with one another using modulated ultra-wideband radar signals. For example, this advantageously provides the ability for the individual sensors to synchronise their internal clocks. In some further sets of embodiments therefore the ultra-wideband sensors can communicate with each other using ultra-wideband signals.

There are a number of dimensions to a given vehicle that may be indicative of its type to aid in classification. The length and width of a vehicle are often indicative of the type of vehicle in question. By taking the data collected by the sensor array, the data processing device can determine the length and/or the width of a vehicle as it passes the sensor array. In some sets of embodiments said data processing system is arranged to determine a length of the vehicle. In some sets of embodiments said data processing system is arranged to determine a width of the vehicle.

As mentioned above in a set of embodiments the data processing system is arranged to determine a speed of the vehicle—that is the absolute magnitude of its rate of movement. This may be useful particularly in traffic monitoring applications, though a person skilled in the art will appreciate that this would also be advantageous in other applications.

Similarly in a set of embodiments the data processing system is arranged to determine an angle or direction of travel of the vehicle. This may also be useful in traffic monitoring applications as explained below, though a person skilled in the art will again appreciate that this would also be advantageous in other applications.

In a set of preferred embodiments the invention is implemented on a so-called multi-lane free flow toll area. The system provided in accordance with the invention may advantageously allow vehicles to be tracked even when travelling across lanes while approaching the toll area. Such a tolling system might comprise a camera and an RF tag reader, and data from the sensor array can advantageously resolve situations where the camera has detected a vehicle in a first lane while the RF tag reader has detected the same vehicle in a second lane at a subsequent time after said vehicle has moved from the first lane to the second lane, preventing the vehicle being charged twice by the tolling system. In contrast in some current traffic monitoring applications such as tolling stations, vehicles changing lanes can cause issues as conventional systems cannot easily track the direction and angle of travel associated with a given vehicle. This can result for example in a vehicle being charged twice if it is detected in two lanes. The problem can be avoided by providing separate individual lanes but these can have a negative impact on traffic flow.

In a set of embodiments the sensors can measure a time between a transmitted signal and a reflection of that signal being received to give a time of flight and therefore distance to the reflecting object. This can be used to determine a distance to the vehicle or other object that caused the reflection.

In a set of embodiments the sensors are arranged to detect wheel axle usage. This advantageous arrangement provides a way to distinguish between raised and lowered axles from the relative height difference between lowered and raised wheels and charge the appropriate fee accordingly. In some tolling systems, the fee charged to a vehicle passing the tolling station is calculated based upon how many axles are in use. The axles of some vehicles can be raised and lowered as required depending on the current load being transported by the vehicle. For example, in some tolling systems, a truck utilising three axles might be charged a lower fee than a truck utilising four axles, despite the trucks having the same dimensions.

It may be possible to determine the classification of a vehicle strictly from the geometry of said vehicle. However in a set of embodiments the data processing system is arranged to determine a number of axles present on the vehicle. This advantageous arrangement may give further confidence in classification decisions made, as typically trucks will have a larger number of wheel axles than a car or motorcycle. This also advantageously allows a truck classification to be further refined depending on the number of axles it has, which may be useful in tolling stations where different toll charges are levied depending on the number of axles a truck has.

It will be appreciated by a person skilled in the art that the analysis required to perform detection and classification of individual vehicles may be performed externally at a remote location utilising the data from the sensor array. Thus when viewed from a second aspect, the present invention provides a vehicle sensing system comprising a plurality of proximity sensors distributed in a fixed spatial array relative to a road such that a distance of each sensor to the nearest adjacent sensor is less than a minimum horizontal dimension of a vehicle to be detected but the maximum dimension of the array is greater than said minimum horizontal dimension of a vehicle to be detected, each of said sensors being configured to determine presence or absence of a vehicle and in use to communicate data regarding said presence determination to a data processing system, said data being such as to allow said data processing system to use data from a plurality of said sensors to detect and classify a vehicle on said road based on at least one dimension of said vehicle.

BRIEF DESCRIPTION OF DRAWING

An embodiment of the present invention will now be described, by way of example only, with reference to the accompanying drawings, in which.

DETAILED DESCRIPTION

Figure 1:
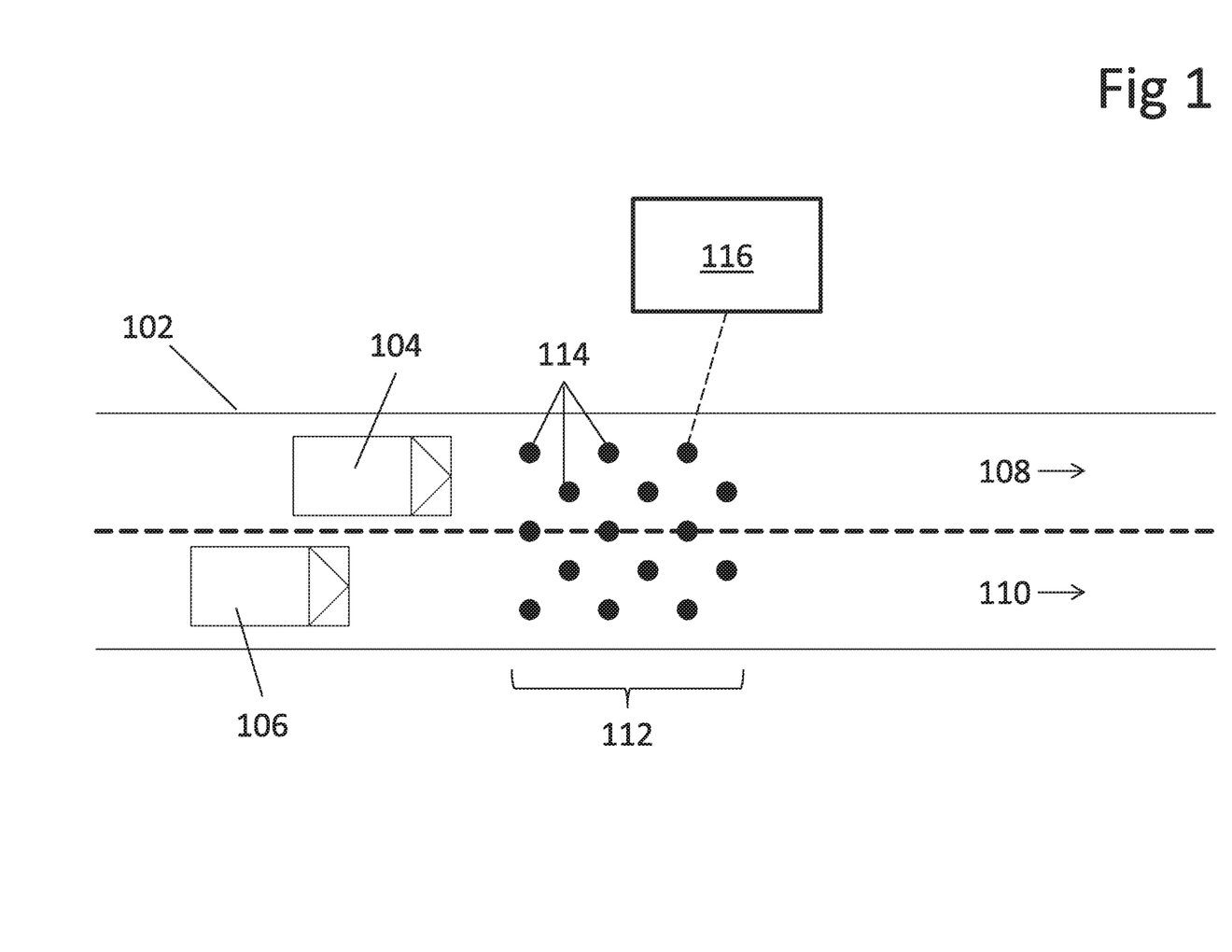
FIG. 1 is an overhead view of an embodiment of the invention.

FIG. 1 shows an overhead view of an embodiment of the invention. A road 102 comprises two lanes 108, 110 with the same direction of traffic flow. A sensor array 112 is arranged such that it straddles both lanes 108, 110.

The sensor array 112 comprises a number of individual high resolution radar (e.g., ultra-wideband, or UWB) sensors 114. A data processing system 116 is connected to, and takes data from the sensor array 112. Travelling in the two lanes 108, 110 are two vehicles 104, 106. At this moment in time, neither of the vehicles 104, 106 is within range of the sensor array 112 and thus no vehicles are detected at this time.

The data processing system 116 in this example is a dedicated roadside unit that takes data from the sensor array 112 and performs the necessary processing for vehicle detection, tracking and classification as will be described below with regard to the other Figures. However in other embodiments the data processing system could comprise a computer or computer network at a remote location. The data processing system could also be distributed across the sensor array 112, with each sensor 114 performing local processing using an onboard processor. Typically this would be on the basis of data generated by the sensor itself and data received from other sensors.

The individual sensors 114 within the sensor array 112 need not connect separately and individually to the data processing system 116 but instead are networked such that each sensor 114 has either a direct connection to the data processing system 116, or an indirect connection via at least one other sensor. Any network topology known in the art per se may be used including ring networks, star networks, bus networks, multi-hop routing etc.

Figure 2:
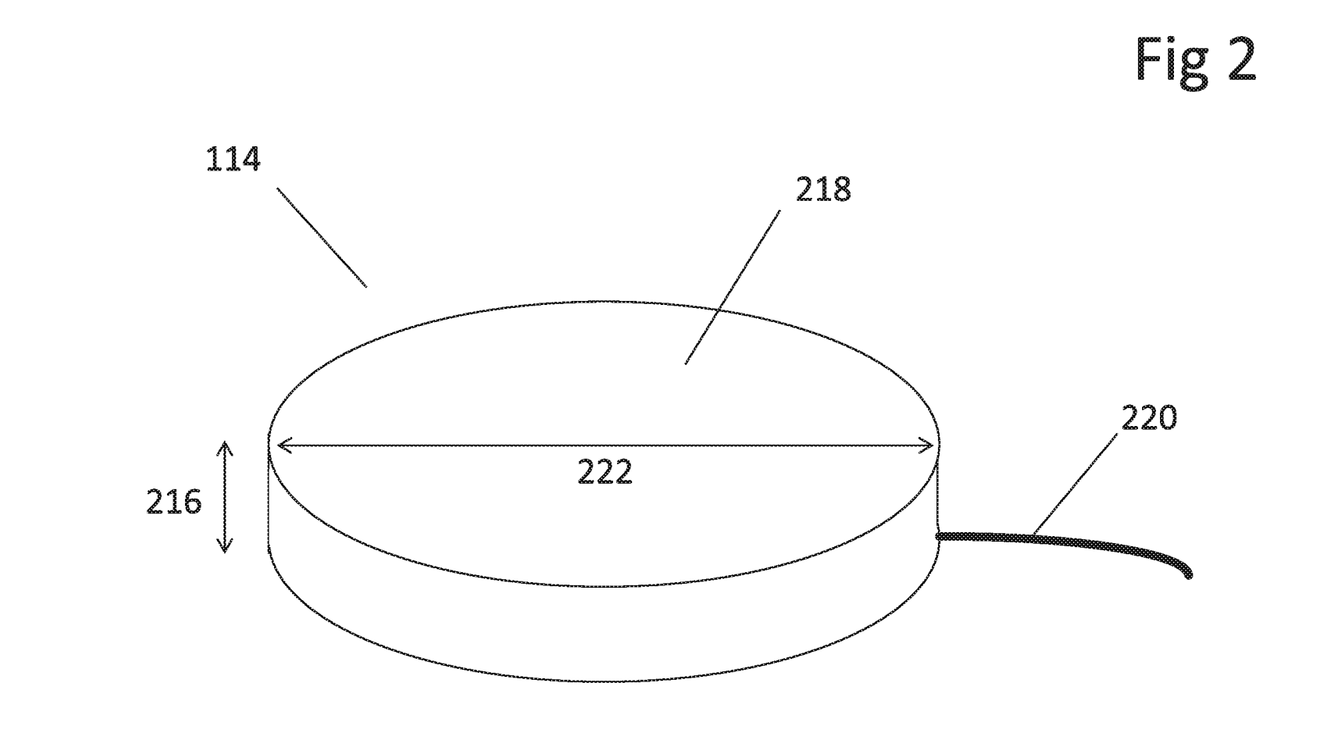
FIG. 2 shows an example of a sensor in accordance with an embodiment of the invention.

FIG. 2 shows an example of the sensor in accordance with an embodiment of the invention. The sensor 114 shown is particularly suitable for mounting within a road surface but a person skilled in the art will appreciate that this same sensor could be utilised in other arrangements such as mounting in the ceiling of a tunnel, on a gantry, platform etc. or freely suspended above a road, track, lane etc. The sensor 114 has a shallow cylindrical shape with a depth 216 and diameter 222 that are suitable for the chosen type of mounting. The particular physical form of the sensor is purely exemplary and other shapes or sizes could equally be employed. By providing a recess in the road surface of substantially the same depth 216 and diameter 222, this sensor 114 can be mounted flush to the road surface such that vehicles can drive over the sensor array with minimal impact. The body of the sensor 114 is sealed to prevent ingress of dirt, moisture etc.

The shape of the sensor 14 allows radar signals to pass through the top surface 218 in an outward radial direction. The sensor 14 contains an antenna (not shown) for transmitting and receiving the signals arranged to radiate energy outwards through the top surface 218. The radiation diverges from the top surface. For example the transmission may have a lobe angle (i.e., the angle of divergence) of approximately forty five degrees.

Signals which are reflected—e.g., from a vehicle—also pass back through the top surface 218 to a suitable receiver inside the body of the sensor. The sensor 114 determines whether there is an object within its detection field depending on a number of factors that may include the time between transmission and reception of signals as described below, the signal strength of the received signal, the frequency composition of the received signals etc.

The sensor 114 utilises a direct-sequence spread spectrum (DSSS) technique (known in the art per se) to transmit a very short RF wideband burst—e.g., having a burst width of the order of $10^{-3}$ seconds (one millisecond), generated by multiplying a radio frequency carrier (i.e., a pulse train) and a specific pseudo-random noise digital signal (often referred to as "chips" in the art). The sensor 114 receives a reflection of the burst and correlates it with the pseudo-random noise signal. The offset between the corresponding pseudo-random noise signal that was encoded within the received reflection and the known pseudo-random noise signal that was transmitted provides the time-delay associated with the propagation of the signal. This time-delay corresponds to the distance between the sensor 114 and the reflector. For example a time delay of $2 \times 10^{-9}$ seconds (2 nanoseconds) would indicate a reflector 0.3 metres away (and therefore a round trip distance of 0.6 metres) given that the radar signal travels at the speed of light ($3 \times 10^8$ m/s). Typically if a vehicle is present, the distance between the sensor and the vehicle will be between 0.1 and 0.5 m. Bursts can either be sent at regular intervals, e.g., at a rate of 100 bursts per second, or can be sent at random intervals to improve resistance to mutual interference between sensors as well as to other forms of interference in general.

The sensor 114 in this embodiment is also provided with a cable 220 that provides it with the ability to communicate with other sensors within the array and/or a data processing system located at the roadside or at some other remote location. This cable 220 may also provide power, though equally the sensor may be battery operated, utilising a battery disposed within the sensor 114 itself.

Figure 3:
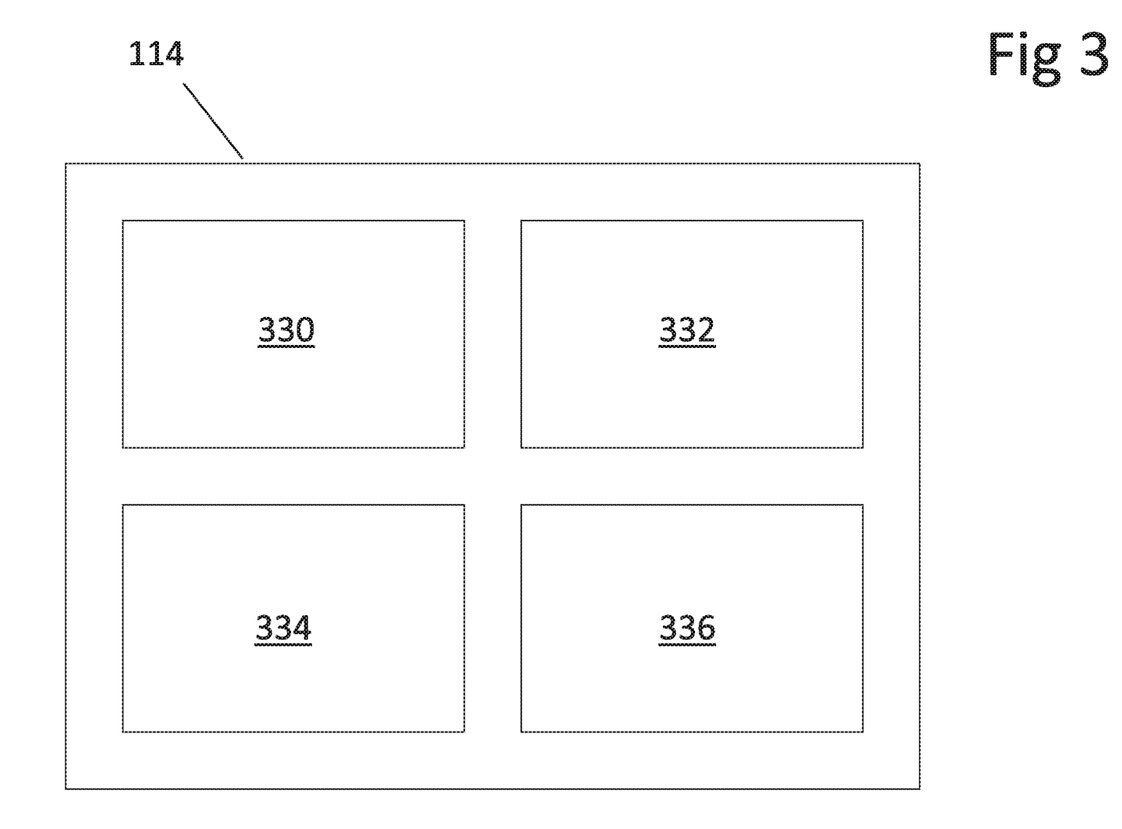
FIG. 3 is a block diagram of a sensor in accordance with an embodiment of the invention.

FIG. 3 shows a block diagram of the sensor 214. This particular sensor 114 comprises four distinct elements: a microcontroller 330, transmitter/receiver module 332, a battery 334, and a data communication module 336.

The microcontroller 330 acts as the primary processing unit for the sensor 114, controlling operation of the transceiver module 332 and the data communication module 336. The transceiver module 332 communicates data to the microcontroller 330 to allow presence of an object within a predetermined range to be determined. The nature of this data will be described later below with reference to FIG. 6.

Depending on the configuration of the sensor array, the communication module 336 may communicate directly with a data processing system at the roadside or at some remote location, or alternatively the sensor 114 may be arranged to communicate with its peers within the array. The data communication module 336 interfaces with the cable 200 (not shown) but equally could enable wireless communication e.g., using IEEE 802.11, Bluetooth (Trade Mark), ZigBee, UWB, or any other such communication technology. In this particular embodiment, the sensor 114 utilises high resolution radar to communicate with peer sensors, allowing the same hardware to be utilised for both vehicle detection and communication.

The battery 336 provided within the sensor 114 provides power to the entire unit and has a long lifetime such that it rarely requires replacement. It is also envisaged that it could be recharged e.g., through a photo-voltaic module.

Figure 4:
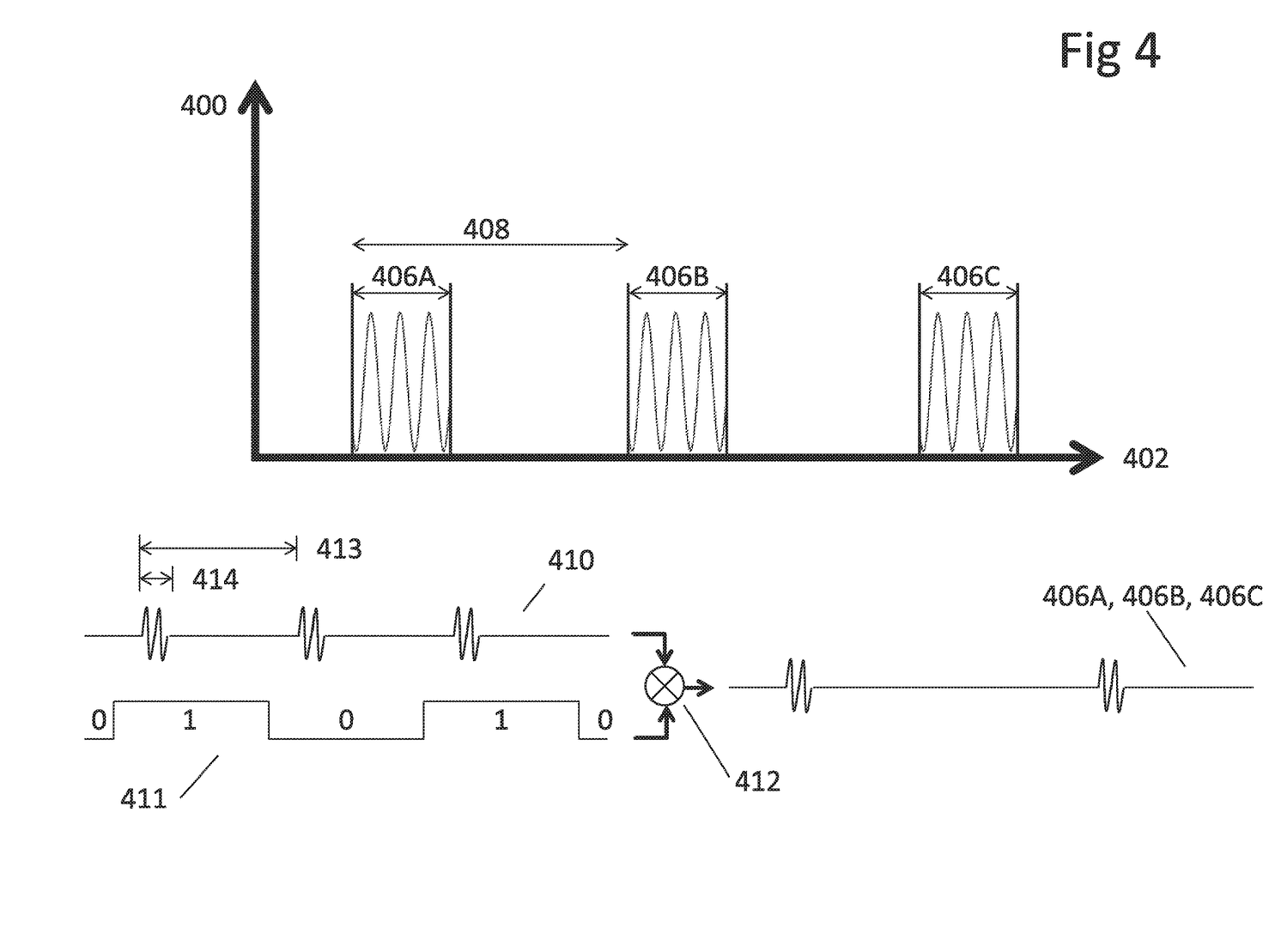
FIG. 4 shows a typical burst mode of operation of a sensor in accordance with an embodiment of the invention.

FIG. 4 shows a typical burst mode of operation of a sensor in accordance with an embodiment of the invention. This ultra-wideband radar sensor utilises DSSS as discussed above with reference to FIG. 1. This Figure shows a plot of signal amplitude 400 as a function of time 402. The sensor is operated using a DSSS ultra-wideband radar signal 404 that is activated and deactivated for short bursts of time. This is shown as a single frequency for the sake of clarity in FIG. 4.

As mentioned previously the bursts 406A, 406B, 406C have a very short duration e.g., of the order of 1 millisecond, although this duration is not shown to scale, again for clarity. The burst cycle length 408 might be 10 milliseconds to give a burst rate of 100 per second. Higher burst rates may give better resolution, enabling not only the detection of an object's presence but also its speed as will be discussed below with reference to FIG. 8.

Each 1 ms burst 406A, 406B, 406C is shown in greater detail in the lower half of FIG. 4. Each burst is constructed by multiplying 412 a duty-cycled pulse train 410 comprising very short pulses 414 of 1 ns duration and a 100 ns cycle 413, with a pseudo-random digital chip sequence 411 that takes digital values "0" or "1". It will be appreciated that the rates supplied above are merely indicative and both higher and lower burst rates and pulse timings may still give usable estimates of speed and position of objects.

Figure 5:
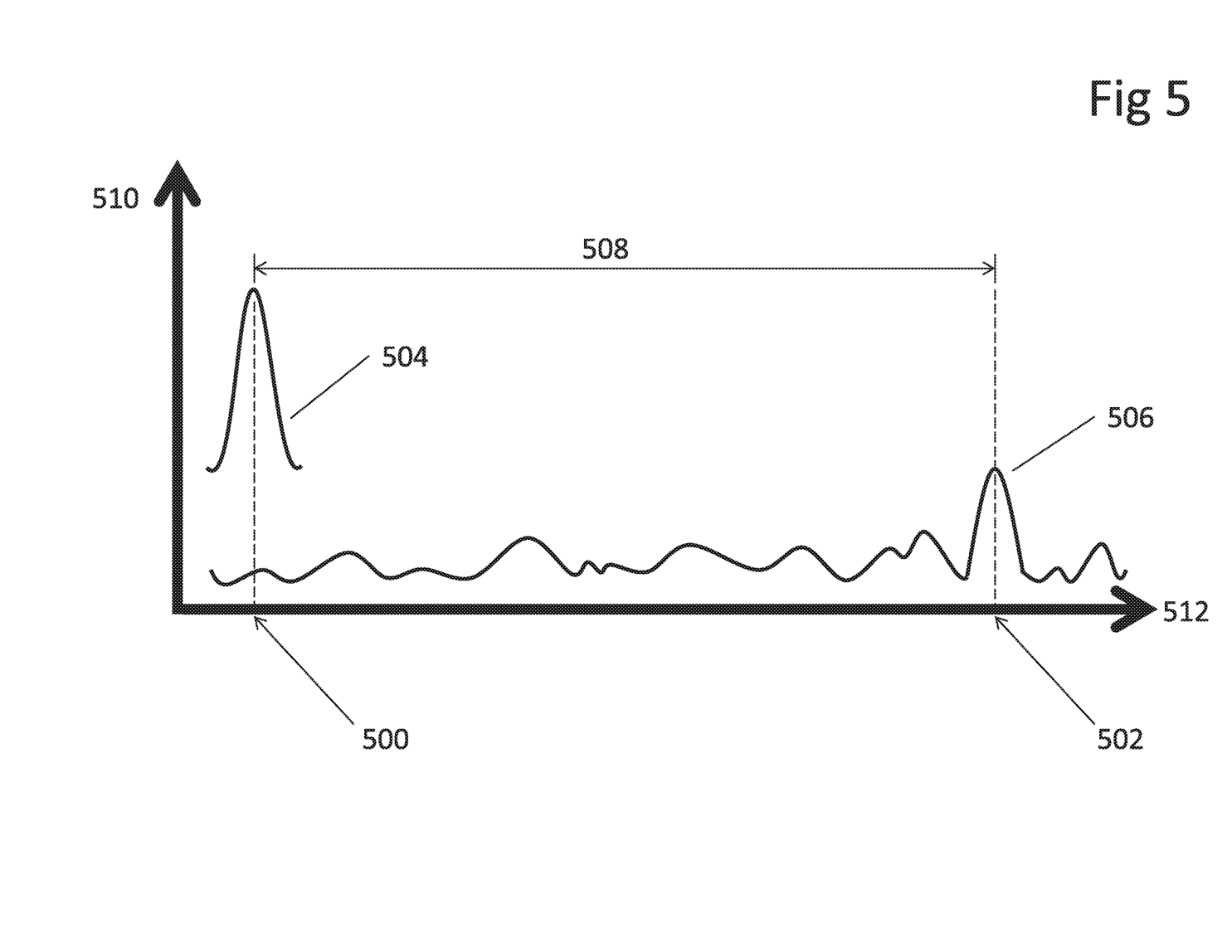
FIG. 5 shows a typical transmission and reception of a burst utilised by a sensor in accordance with an embodiment of the invention.

FIG. 5 shows a typical transmission and reception of a burst utilised by a sensor in accordance with an embodiment of the invention, showing the signal power 510 as a function of time 512 for both transmitted and received signals. At an initial time 500 a burst 504 (corresponding to the bursts 406A, 406B, 406C in FIG. 4) is transmitted by the sensor which propagates through the sensor housing and into the surrounding air. After a delay 508 at a subsequent time 502, a reflected burst 506 is received by the sensor. The reflected peak is detected by correlating a number of time-offset copies of the transmitted pseudo-random noise chip sequence with the received reflected signal and choosing the highest correlation peak. The duration of the delay 508 corresponds to the distance between the sensor and the object that caused the reflected burst 506. Since the signal speed is known, the distance over which the signal has travelled can be calculated. It will be appreciated that the burst shown in FIG. 5 is idealised, while in reality there will likely be a number of received false echoes and the reflected burst 506 will likely be spread out over a greater time period when compared to the transmitted burst 504.

Figure 6:
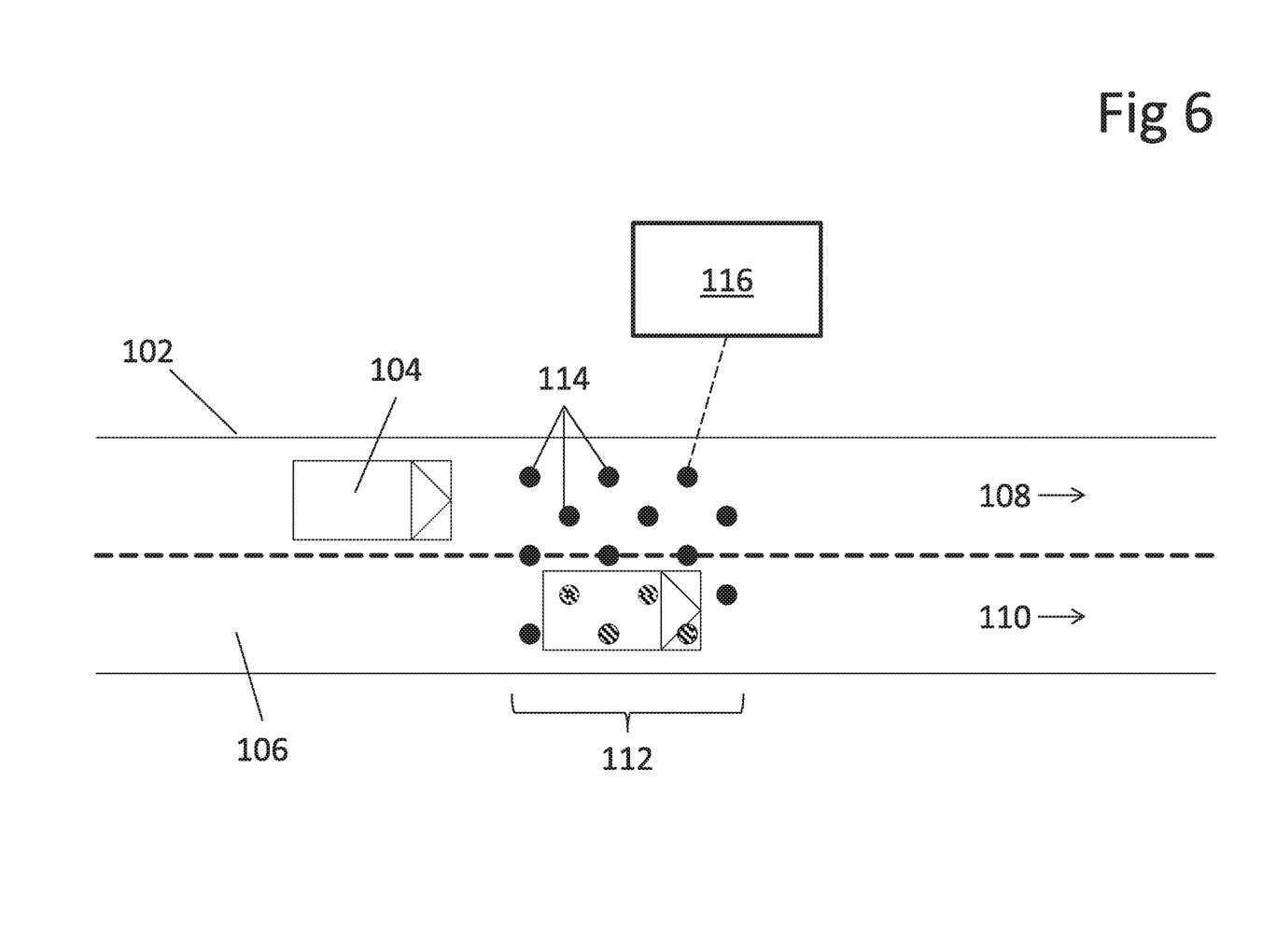
FIG. 6 is a further view of an embodiment of the invention wherein a vehicle has entered the detection zone of the sensor array.

Operation of the system will now be described. FIG. 6 shows a view similar to FIG. 1 in which one of the vehicles 106 has entered the detection zone of the sensor array 112. The vehicle 106 is now proximate to (i.e., within the field of view of) a selection of the individual sensors 114 within the sensor array 112. Each of these individual sensors 114 reports to the data processing system 116 that there is an object within its individual detection zone.

The measurements from all sensors 114 in the sensor array 112 are accurately timestamped before being transmitted to the data processing system 116. The data processing system 116 then normalises all of the measurements to a common time base and then analyses the data to determine a moving bounding box associated with the vehicle 106. From this bounding box the data processing system 116 obtains the speed and direction of the vehicle. The length and width of the bounding box alongside other parameters including the number of axles can then be used by the data processing system 116 to determine the classification of the vehicle 106.

Figure 7:
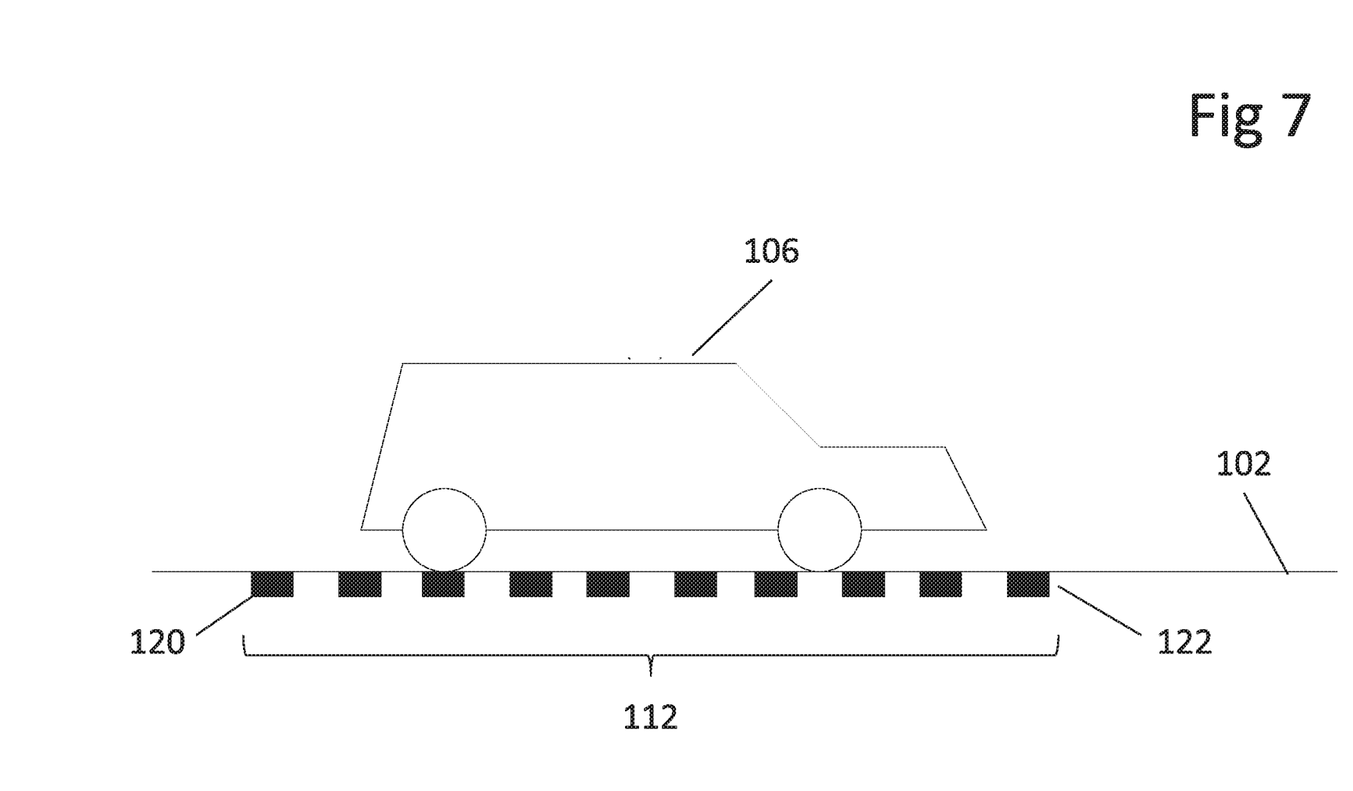
FIG. 7 is a side-on view of an embodiment of the invention.

FIG. 7 shows a side-on view of the situation described above with reference to FIG. 6 wherein a vehicle 106 is driving over the sensor array 112. While the sensor array 112 extends beyond the length of the vehicle 106, only the sensors between the rearmost covered sensor 120 and the foremost covered sensor 122 detect the vehicle 106 at this moment in time. Any further sensors within the sensor array 112 that are not substantially covered by the vehicle 106 do not detect the presence of this particular vehicle at this time, but there may be other separate vehicles on the road 102 being detected by other portions of the sensor array 122 simultaneously.

Figure 8:
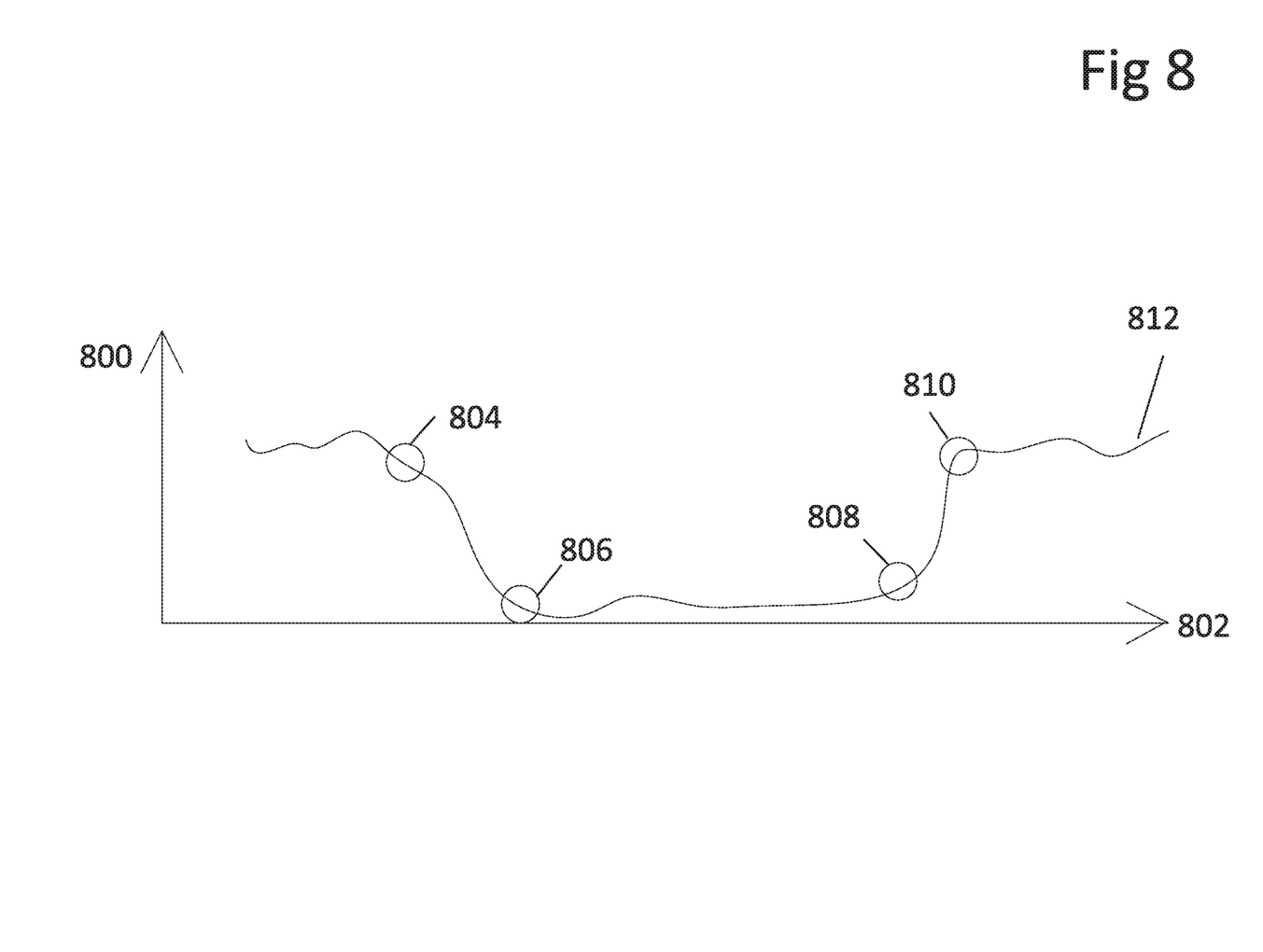
FIG. 8 is a graph illustrating the operation of an embodiment of the invention.

FIG. 8 shows a graph illustrating the operation of an embodiment of the invention. On the y-axis is detected height 800, and on the x-axis is time 802. Shown on the graph is a trace 812 of the detected height over time for an individual sensor within a sensor array in accordance with the present invention.

When the sensor detects that the height 800 is beyond a particular threshold value, it is determined that no vehicle is proximate to the sensor. This detected 'height' (i.e., an echo distance determined by the radar) may not be to a particular object but is indicative of the extent that received reflections of transmitted signals have travelled and that as it is sufficiently far, no vehicle is within the detection zone of the sensor.

When no object is proximate to the sensor, the detected height floats around an average "background noise" level that is largely determined by the environment surrounding the sensor. It is noteworthy that regardless of the presence of an object within the sensor's field of view, the nature of the changing environment will lead to fluctuations in the detection signal as is apparent on the trace 812.

At an initial time 804, a vehicle is not yet over but is approaching the sensor. This causes the detected height 800 to start reducing over time as the vehicle gets closer.

At a later time 806, the sensor is completely obstructed by the vehicle and the detected height 800 drops to a value below a given threshold such that the sensor determines that a vehicle is present within its detection zone. The sensor subsequently reports to a data processing system or its peers that an object is present.

After a while, at time 808, the vehicle begins to exit the detection zone of the sensor and the detected height 800 begins to increase again, tending toward the background noise level, which is reached around time 810 when it is determined that the vehicle is no longer proximate to the sensor.

Each of the sensors within the sensor array will have its own time-varying detected height trace, and by combining the results from the entire array of sensors, it is then possible to determine numerous properties of the vehicle(s) within the area covered by the sensor array. For example, from the groupings of sensors in proximity to one another that all report that they have a vehicle within their detection zone, a bounding box can be defined that describes the geometry of a vehicle that is within the confines of the sensor array. Once this bounding box is defined, the length and width of the box indicate the length and width of the vehicle that gave rise to said bounding box.

Furthermore, from the gradient of the trace 812 between transitions such as between points 804 and 806 or between 808 and 810 it is possible to determine the speed of the vehicle. However, in order to do so, typically edge information from multiple adjacent sensors will need to be combined. It is also possible to estimate the speed of the vehicle using Doppler shifts in the frequency of the received signals. Using the Doppler shifts in frequency to estimate the speed of the vehicle also means a lower burst rate can be used.

Figure 9:
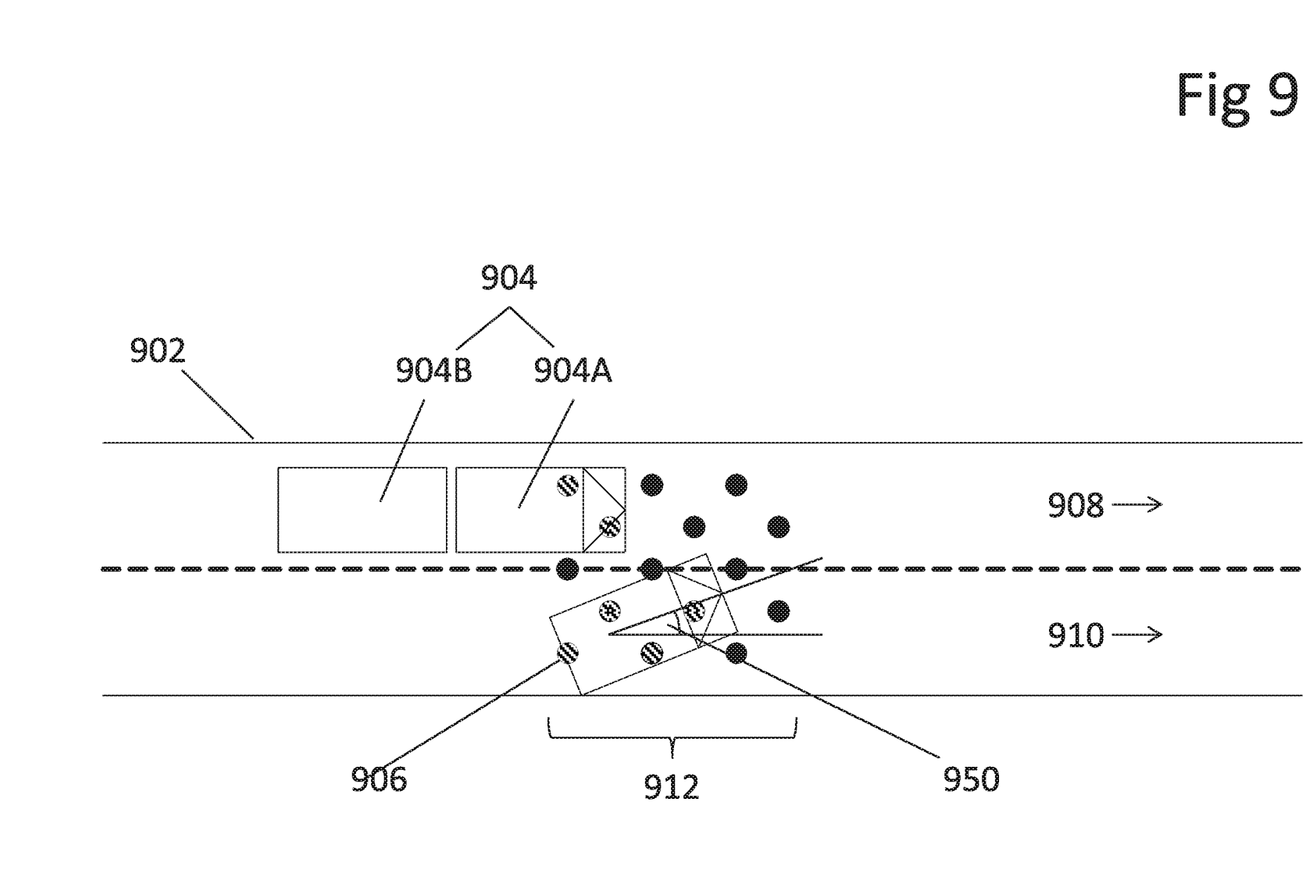
FIG. 9 is an overhead view of an embodiment of the invention where a first vehicle is a truck and a second vehicle is travelling at an oblique angle to the road direction.

FIG. 9 shows an overhead view of an embodiment of the invention where a first vehicle 904 is a truck and a second vehicle 906 is travelling at an oblique angle to the road direction.

In one lane 908 of the road 902 is a truck 904 which comprises a cab 904A and a trailer 904B. The sensor array 912 will detect the cab 904A and the trailer 904B as separate objects, however as the spacing between the two components of the vehicle 904A, 904B is small and the direction and speed of the two components are identical, the system is able to determine correctly that the vehicle 904 is a single truck.

In a second lane 910 of the road 902, a vehicle 906 is not travelling parallel to the lane and in the direction of traffic flow, but is instead travelling at an oblique angle 950 in order to change lanes. While conventional systems would not be able to resolve such driving patterns, the data from the sensor array 912 is used to create a bounding box at any angle from which parameters relating to the vehicle 906 such as its length, width, and speed from which classification of the vehicle can be determined. The system is also able to determine the direction in which the vehicle 906 is travelling as well as the angle 950 relative to normal traffic flow at which it is travelling.

Figure 10:
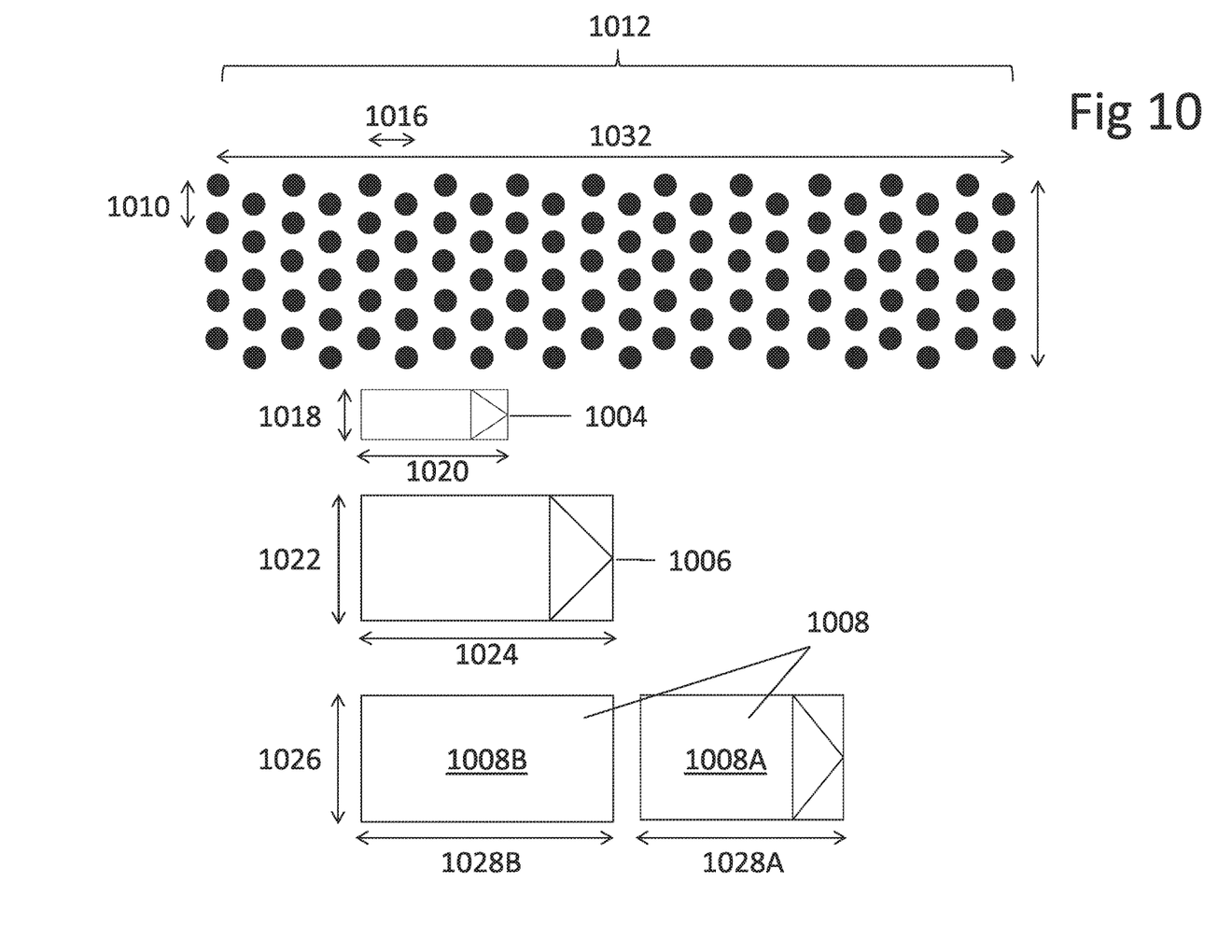
FIG. 10 shows the relative spacings between the sensors compared to vehicle sizes in accordance with an embodiment of the invention.

FIG. 10 shows the relative spacings 1010, 1016 between the sensors 114 compared to vehicle sizes in accordance with an embodiment of the invention. A sensor array 1012 comprises a number of individual sensors 114 as has been described previously arranged in an interleaved or diamond pattern. These sensors 114 are spaced apart with a longitudinal separation distance 1010 normal to the direction of traffic flow of e.g., one metre and a transverse separation distance 1016 parallel to the direction of traffic flow of e.g., 0.25 metres. These figures are of course purely exemplary. The entire sensor array 1012 has a lateral width 1030 extending across the road normal to the direction of traffic flow and a longitudinal length 1032 parallel to the direction of traffic flow.

For illustrative purposes a motorcycle 1004, a car 1006, and a truck 1008 (comprising a cab 1008A and a trailer 1008B) are shown. In this particular example, the motorcycle 1004 is the narrowest vehicle that is to be detected. Accordingly, the lateral separation distance 1010 must be less than the width of the motorcycle 100018, but the width of the entire array 1030 must be greater than the width of the motorcycle 1018. In this instance, the width 1030 of the array 1012 is in fact greater than the width 1026 associated with the truck 1008, the widest vehicle to be detected. The car 1006 with width 1022 falls between these ranges.

The longitudinal separation 1016 between the individual sensors is also less than the minimum length to be detected, in this case the motorcycle's length 1020. However, similarly to the width requirements, the length of the array 1032 is greater than the length 1028B of the truck trailer 1008B, the longest vehicle to be detected. The car 1006 with length 1024 and the truck cab 1008A with length 1028A fall between these ranges.

It can be seen therefore that the motorcycle 1004, car 1006, and truck 1008 each fit within the sensor array 1012, but the spatial resolution of the sensors 114 is sufficiently fine to be able to resolve each of the vehicle classifications. It will be appreciated that while the truck 1008 fits within the sensor array 1012 in its entirety, the system can adequately detect and classify the truck 1008 when the array 1012 is longer than the individual cab 1008A and trailer 1008B but shorter than the combination of the two.

Thus it will be seen that a vehicle detection and classification system has been described. Although a particular embodiment has been described in detail, many variations and modifications are possible within the scope of the invention.

The invention claimed is:

1. A vehicle detection and classification system comprising a plurality of ultra-wideband proximity sensors distributed in a fixed spatial array relative to a road, wherein each sensor is spaced from a nearest adjacent sensor by a respective distance less than a minimum horizontal dimension of a vehicle to be detected but the array has a maximum dimension greater than said minimum horizontal dimension of a vehicle to be detected, each of said sensors being configured to determine presence or absence of a vehicle and to communicate data regarding said presence determination to a data processing system, said data processing system being configured to use data from a plurality of said sensors to detect and classify a vehicle on said road based on at least one dimension of said vehicle, wherein at least of part the array of sensors is disposed beneath or flush with a surface of the road.

2. The vehicle detection and classification system as claimed in claim 1 wherein the array of sensors is provided in one or more planes parallel to a surface of the road.

3. The vehicle detection and classification system as claimed in claim 1 wherein at least some of the sensors are configured to communicate said data to said data processing system via at least some other sensors.

4. The vehicle detection and classification system as claimed in claim 1 wherein the ultra-wideband sensors can communicate with each other using ultra-wideband signals.

5. The vehicle detection and classification system as claimed in claim 1 wherein said data processing system is arranged to determine one or more of: a length; a width; a speed; or an angle of travel of the vehicle.

6. The vehicle detection and classification system as claimed in claim 1 arranged to determine a distance to the vehicle.

7. The vehicle detection and classification system as claimed in claim 1 arranged to detect axle usage.

8. The vehicle detection and classification system as claimed in claim 1 wherein the data processing system is arranged to determine a number of axles present on the vehicle.

9. The vehicle detection and classification system as claimed in claim 1 wherein at least part of said data processing system is distributed across the array of sensors.

10. The vehicle detection and classification system as claimed in claim 1 wherein at least part of the array of sensors is disposed above a surface of the road such that vehicles pass beneath the sensors.

11. A vehicle sensing system comprising a plurality of ultra-wideband proximity sensors distributed in a fixed spatial array relative to a road, wherein each sensor is spaced from a nearest adjacent sensor by a respective distance less than a minimum horizontal dimension of a vehicle to be detected but the maximum dimension of the array is greater than said minimum horizontal dimension of a vehicle to be detected, each of said sensors being configured to determine presence or absence of a vehicle and in use to communicate data regarding said presence determination to a data processing system, said data being such as to allow said data processing system to use data from a plurality of said sensors to detect and classify a vehicle on said road based on at least one dimension of said vehicle, wherein at least part of the array of sensors is disposed beneath or flush with a surface of the road.

12. The vehicle sensing system as claimed in claim 11 wherein the array of sensors is provided in one or more planes parallel to a surface of the road.

13. The vehicle sensing system as claimed in claim 11 wherein at least some of the sensors are configured to communicate said data to said data processing system via at least some other sensors.

14. The vehicle sensing system as claimed in claim 11 wherein the ultra-wideband sensors can communicate with each other using ultra-wideband signals.

15. The vehicle sensing system as claimed in claim 11 wherein said data processing system is arranged to determine one or more of: a length; a width; a speed; or an angle of travel of the vehicle.

16. The vehicle sensing system as claimed in claim 11 arranged to determine a distance to the vehicle.

17. The vehicle sensing system as claimed in claim 11 arranged to detect axle usage.

18. The vehicle sensing system as claimed in claim 11 wherein the data processing system is arranged to determine a number of axles present on the vehicle.

19. The vehicle sensing system as claimed in claim 11 wherein at least part of said data processing system is distributed across the array of sensors.

20. The vehicle sensing system as claimed in claim 11 wherein at least part of the array of sensors is disposed above a surface of the road such that vehicles pass beneath the sensor.

* * * * *